Jan. 7, 1964  H. J. McCAULEY  3,116,836
BICYCLE STAND
Filed Jan. 10, 1963
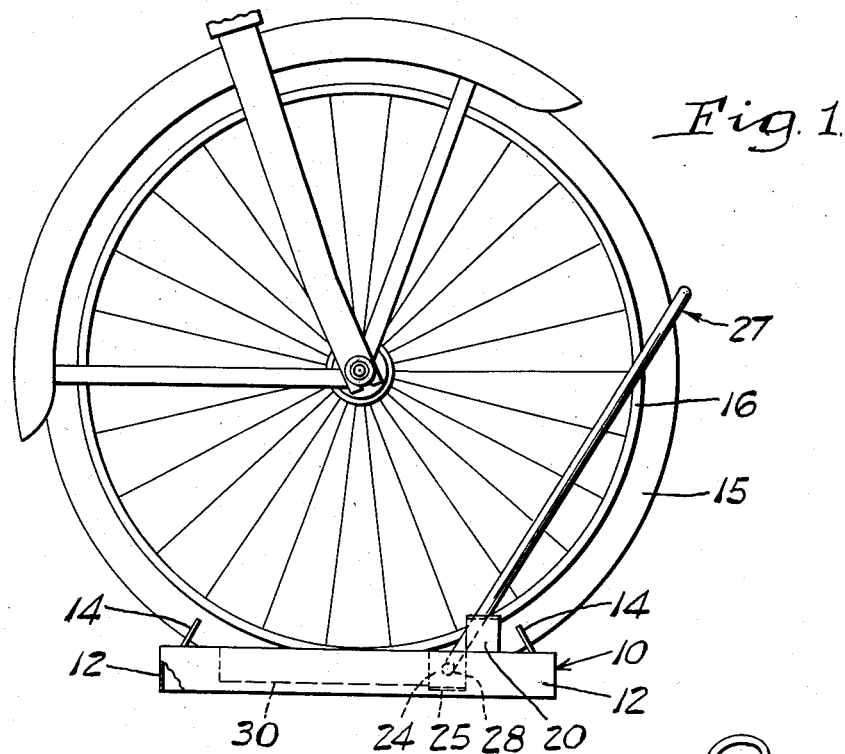
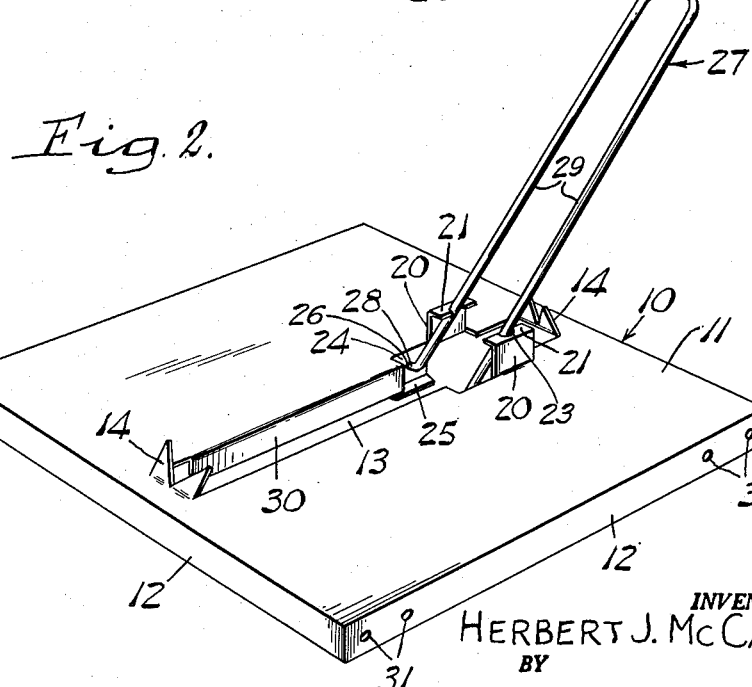
INVENTOR.
HERBERT J. McCAULEY
BY
Christel & Bean
ATTORNEYS

United States Patent Office 3,116,836
Patented Jan. 7, 1964

3,116,836
BICYCLE STAND
Herbert J. McCauley, 660 Grant St., Buffalo, N.Y.
Filed Jan. 10, 1963, Ser. No. 250,565
7 Claims. (Cl. 211—21)

This invention relates to supporting stands for bicycles.

Supporting stands for bicycles are of course well known and many such supporting stands of the prior art provide a pair of spaced upstanding bars for receiving a bicycle wheel therebetween to support the bicycle in upright position. The bicycle stand of the present invention is of that general type.

The bicycle stand of the present invention is an improvement over similar supports of the prior art in that it is of extremely simple construction whereby it may be manufactured economically and is relatively foolproof and durable. Furthermore, the bicycle supporting stand of the present invention comprises only two parts which may be assembled and disassembled with the greatest of ease, requiring no screws or other fastenings to retain assembly of the parts.

The two parts which make up the entire assembly of the supporting stand of the present invention, when disassembled, form a flat package which is very convenient for shipment and for storage. Furthermore, the two individual parts which entirely comprise the bicycle stand of the present invention are both extremely simple and economical to fabricate, comprising merely a bent rod and a stamping. Supporting stands of the present invention may be used singly or may readily be interconnected to form a supporting structure for a series or row of bicycles.

While a single specific form of the bicycle supporting stand of the present invention is illustrated in the accompanying drawing and described in detail in the following specification, it is to be understood that such form is set forth to illustrate the principles of the present invention and that various mechanical modifications may be made without departing from the principles of the invention, the scope of the same being limited only as defined in the appended claims.

In the drawing:

FIG. 1 is a side elevational view of one form of the bicycle supporting stand of the present invention with the front wheel portion of a bicycle shown supported thereby in upright position; and FIG. 2 is a perspective view of the bicycle supporting stand of FIG. 1 in assembled condition.

In the drawing, like characters of reference denote like parts and the numeral 10 generally designates a sheet metal base member which has a horizontal panel portion 11 and depending flanges 12 at each of its four marginal edges. The panel portion 11 of base 10 has a medial longitudinally extending oblong opening 13. Flanges 14 are struck obliquely upwardly from each end of opening 13 and are V-shaped at their upper edges to receive the tire 15 of a bicycle wheel 16 as shown in FIG. 1.

Adjacent to one end of opening 13 are a pair of upstanding flanges 20 having inwardly bent upper terminal portions 21 which are notched at their inner edges as at 23 for a purpose which will presently appear. Directly adjacent to the upstanding flanges 20 are a pair of depending flanges 24 terminating in inwardly bent flanges 25. Flanges 24 are perforated as at 26 to receive journal or trunnion portions of a wheel support member which will now be described.

The wheel support member, which comprises the only part of the present structure in addition to the foregoing base, comprises a U-shaped rod 27 terminating at its opposite ends in outwardly projecting trunnion portions 28. To assemble the U-shaped member 27 with respect to the base 10 it is merely necessary to press the legs 29 thereof together with one hand, insert the trunnions 28 in the perforations 26 of flanges 24, dispose the legs 29 to register with the notches of flanges 21, and release the legs, whereby they assume the assembled position illustrated in FIG. 2.

The side edges of opening 13 between the depending flanges 24 and the opposite end of the opening are provided with longitudinal depending flanges 30 which flare slightly toward each other to form a somewhat V-shaped trough for receiving the lowermost portion of the tire 15 of wheel 16.

The side flanges 12 of base 10 may be perforated as at 31 whereby a series of bases may be bolted together to form a rigid supporting structure for any number of bicycles.

In the preferred form illustrated in the drawing the upstanding flanges 20 and the depending flanges 24 are substantially coplanar and the notches in the terminal flanges 21 extend substantially the full depth of such terminal flanges whereby the legs of the U-shaped member lie along the facing surfaces of the upstanding and depending flanges.

What I claim is:

1. A bicycle supporting stand comprising a horizontally extending sheet metal base member having marginal flanges supporting the same above a surface on which the flanges rest, said horizontally extending base member having a pair of spaced depending flanges and an adjacent pair of spaced upstanding flanges, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof, and a channel formation in said base member in alignment with said U-shaped member and extending away from said flanges in a direction opposite to the direction of horizontal extent of said U-shaped member, said channel formation being adapted to receive the bottom portion of said bicycle wheel.

2. A bicycle supporting stand comprising a horizontally extending sheet metal base member having marginal flanges supporting the same above a surface on which the flanges rest, said horizontally extending base member having a pair of spaced depending flanges and an adjacent pair of spaced upstanding flanges, said upstanding flanges being substantially co-planar with said depending flanges, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof, and a channel formation in said base member in alignment with said U-shaped member and extending away from said flanges in a direction opposite to the direction of horizontal extent of said U-shaped member, said channel formation being adapted to receive the bottom portion of said bicycle wheel.

3. A bicycle supporting stand comprising a base member having a pair of horizontally spaced upstanding members notched to receive tread portions of a bicycle wheel, adjacent pairs of spaced depending and upstanding flanges, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof.

4. A bicycle supporting stand comprising a base member having a pair of horizontally spaced upstanding members notched to receive tread portions of a bicycle wheel, adjacent pairs of spaced depending and upstanding flanges, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof, and an elongated recess extending between said notched upstanding members to receive the bottom portion of said bicycle wheel.

5. A bicycle supporting stand comprising a base member having a pair of horizontally spacing upstanding members notched to receive tread portions of a bicycle wheel, adjacent pairs of spaced depending and upstanding flanges, said upstanding and depending flanges being substantially co-planar, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof.

6. A bicycle supporting stand comprising a base member having a pair of horizontally spaced upstanding members notched to receive tread portions of a bicycle wheel, adjacent pairs of spaced depending and upstanding flanges, said upstanding and depending flanges being substantially co-planar, said depending flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof, and an elongated recess extending between said notched upstanding members to receive the bottom portion of said bicycle wheel.

7. A bicycle supporting stand comprising a horizontally extending base member having a longitudinal opening and a pair of upstanding members at opposite ends thereof notched to receive the tread portion of a bicycle wheel, a pair of spaced depending flanges and an adjacent pair of upstanding flanges, said dependent flanges being perforated and said upstanding flanges having inwardly extending notched terminal portions, and a bicycle wheel receiving member comprising an inverted U-shaped member having outwardly extending trunnions at its opposite ends, said trunnions bearing in the perforations of said depending flanges and the legs of said U-shaped member engaging the notched terminal portions of the upstanding flanges whereby the U-shaped member is supported in oblique generally upstanding position to receive a bicycle wheel between the legs thereof, the medial portion of said longitudinal opening being adapted to receive the lowermost portion of said bicycle wheel tread portion.

References Cited in the file of this patent

UNITED STATES PATENTS

| | | |
|---|---|---|
| 529,939 | Noderer | Nov. 27, 1894 |
| 556,806 | Chandler | Mar. 24, 1896 |
| 2,472,028 | Son | May 21, 1949 |

FOREIGN PATENTS

| | | |
|---|---|---|
| 18,443 | Great Britain | Aug. 15, 1911 |
| 475,122 | Italy | Oct. 15, 1952 |